United States Patent [19]

Takumi et al.

[11] Patent Number: 4,613,585

[45] Date of Patent: Sep. 23, 1986

[54] PROCESS OF PREPARING ALUMINA FOR USE IN CATALYST CARRIER

[75] Inventors: Shizuo Takumi, Kamakura; Toshio Hashimoto; Masaru Tatsushima, both of Isehara, all of Japan

[73] Assignee: Nikki-Universal Co., Ltd., Tokyo, Japan

[21] Appl. No.: 634,943

[22] Filed: Jul. 27, 1984

[30] Foreign Application Priority Data

Aug. 4, 1983 [JP] Japan ................. 58-142798

[51] Int. Cl.$^4$ ................. B01J 23/00; C01F 7/02
[52] U.S. Cl. ................. 502/355; 423/626; 423/628
[58] Field of Search ................. 502/355; 423/626, 628

[56] References Cited

U.S. PATENT DOCUMENTS

| | | | |
|---|---|---|---|
| 2,973,245 | 2/1961 | Teter et al. | 423/626 |
| 2,984,630 | 5/1961 | Braithwaith | 502/355 |
| 2,988,520 | 6/1961 | Braithwaith | 502/355 |
| 3,124,418 | 3/1964 | Malley et al. | 423/626 |
| 3,151,939 | 10/1964 | Kehl et al. | 502/355 |
| 3,520,654 | 7/1970 | Carr et al. | 502/355 |
| 3,539,468 | 11/1970 | Wright | 423/628 |
| 3,630,670 | 12/1971 | Bell et al. | 423/626 |
| 3,864,461 | 2/1975 | Miller et al. | 423/628 |
| 4,154,812 | 5/1979 | Sanchez et al. | 423/628 |
| 4,313,923 | 2/1982 | Block et al. | 423/628 |

FOREIGN PATENT DOCUMENTS

| | | | |
|---|---|---|---|
| 2302724 | 8/1973 | Fed. Rep. of Germany | 423/628 |
| 1888772 | 2/1962 | United Kingdom | 423/628 |

*Primary Examiner*—Andrew H. Metz
*Assistant Examiner*—Helane Myers
*Attorney, Agent, or Firm*—Flynn, Thiel, Boutell & Tanis

[57] ABSTRACT

Disclosed is a process of preparing an alumina carrier which comprises kneading an amorphous alumina hydrate, whose alumina concentration is in the range of 28–35 wt. % and which has been obtained by neutralizing an aluminum sulfate solution with a sodium aluminate solution at two stages, while endowing said hydrate with sufficient shearing effect and alternate compression and expansion effect; extruding a resulting dough; drying and calcining the extrudates. According to this process, it becomes possible to control the growth of pseudoboehmite grains contained in the alumina hydrate by controlling the time required for kneading, and accordingly it becomes possible to control the pore distribution of the finally obtained alumina carrier.

5 Claims, 1 Drawing Figure

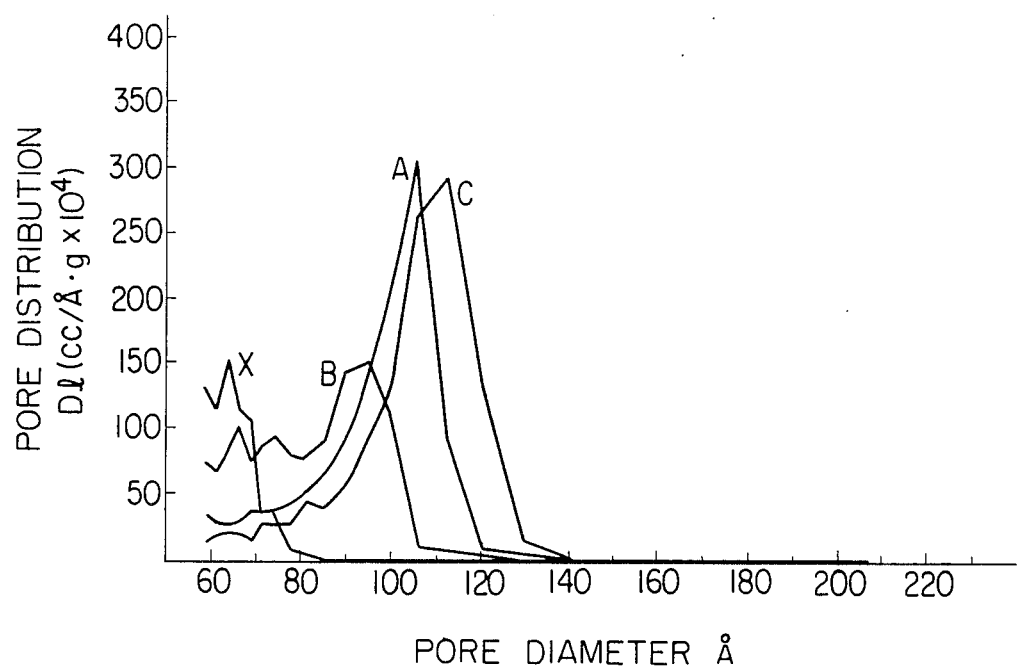

4,613,585

PROCESS OF PREPARING ALUMINA FOR USE IN CATALYST CARRIER

BACKGROUND OF THE INVENTION

The present invention relates to a process of preparing alumina useful as a catalyst carrier, and in more detail relates to a process of preparing alumina designed so that in the course of kneading an amorphous alumina hydrate cake produced by the neutralization reaction of aluminum sulfate with sodium aluminate, the degree of growth of pseudoboehmite grains contained in said cake may be controlled. The gamma alumina or eta alumina obtained by drying and calcining a pseudoboehmite gel-containing amorphous alumina hydrate has hitherto been widely utilized as a catalyst carrier because said alumina has a large specific surface area and is also superior in thermal stability. As is generally known, the performance of a catalyst supported on alumina owes much to the physical and chemical properties of the alumina used in the carrier, in particular its physical properties, namely the specific surface area and porous characteristic, because these are important factors which control the performance of a catalyst supported on alumina. However, as the specific surface area and pore characteristic required for alumina carrier vary depending on the particular catalysts for which said alumina is used, the specific surface area and pore characteristic called for in the alumina carrier are not uniform.

The greatest importance of the alumina carrier used for a hydrocarbon reforming catalyst, for instance, consists in the fact that said alumina carrier has a large specific surface area, rather than the nature of its pore characteristic. In contrast, in the case of the alumina carrier used for a desulfurizing catalyst, it is important that said carrier has a pore characteristic suitable for the molecule taking part in the desulfurization reaction, more specifically, that the carrier has an average pore diameter a pore volume suitable for the desulfurization reaction. Referring to the specific surface area in this instance, although the catalytic activity also increases as the specific surface area increases, the pores of less than 50 Å, which are very remarkably attributable to increase in specific surface area, are easily plugged by coke deposit. In order that the catalyst may hold its stability even if the specific surface area somewhat deteriorates, it is rather preferable that micro-pores of less than 50 Å should not exist. On the other hand, an alumina carrier containing little impurities is desirable, because impurities present in a catalyst carrier exert an enormous influence upon the chemical properties depending on its usage.

In these circumstances, when preparing an alumina carrier from the amorphous alumina hydrate, there has usually been employed the process which comprises stirring an aqueous slurry of said amorphous alumina hydrate at elevated temperatures and under weak alkaline conditions to thereby control the degree of growth of pseudoboehmite grains contained in said slurry, thereby regulating, as requested, the pore characteristic and specific surface area of the finally obtained alumina carrier. However, the aforesaid prior art process is not always advantageous in that it takes a relatively long period of time to make the pseudoboehmite grains grow in the aqueous slurry of the amorphous alumina hydrate.

BRIEF SUMMARY OF THE INVENTION

The inventors have obtained a new finding concerning the process of preparing an alumina carrier. That is, the inventors have found that since a slurry of an amorphous alumina hydrate obtained by two-stage neutralization of aluminum sulfate with sodium aluminate under the specific conditions referred to afterwards is markedly superior in filtrability, there can be obtained a filter cake having about 30 wt. % of $Al_2O_3$ concentration, and accordingly by kneading this filter cake it is made possible to grow pseudoboehmite grains in a short time.

The process of preparing an alumina catalyst carrier according to the present invention comprises the steps of: (a) simultaneously pouring an aluminum sulfate solution and a sodium aluminate solution into deionized water in a vessel for reacting aluminum sulfate with sodium aluminate at a pH 6.0–8.5 and temperature of 50°–65° C. thereby to prepare a first aqueous slurry containing an amorphous alumina hydrate; (b) adding, to this aqueous slurry, an aqueous sodium aluminate solution in an amount sufficient to neutralize the first aqueous slurry, the sum of the sodium aluminate used in the steps (a) and (b) corresponds to 0.95–1.05 equivalent of the aluminum sulfate used in the step (a) thereby to prepare a second aqueous slurry having an $Al_2O_3$ concentration of 7 wt. % or more; (c) filtering off an amorphous alumina hydrate contained in said second aqueous slurry, and washing a resulting filter cake firstly with a dilute aqueous ammonia and then with a dilute nitric acid solution and washing the same again with a dilute aqueous ammonia so as to regulate the pH of the filter cake to range of 7.5–10.5; (d) dehydrating this filter cake on a filter press for increasing its $Al_2O_3$ concentration to be in the range of 28–35 wt. %, and thereafter supplying the same to a self-cleaning type mixer for kneading it for the residence time of 10 seconds or more; and (e) extruding a dough obtained from the step (d), thereafter drying and calcining the resulting extrudates.

BRIEF DESCRIPTION OF THE DRAWING

The attached drawing denotes a pore distribution curve of each of alumina carriers obtained from Examples 1-2 and Comparative Example referred to afterwards.

DETAILED DESCRIPTION OF THE INVENTION

The present invention will be explained in more detail in the order of steps hereinafter. As the aluminum sulfate solution and the sodium aluminate solution used in the present invention, there may be employed those obtained by dissolving commercially available aluminum sulfate and sodium aluminate in water respectively. Taking the cost into consideration, however, it is preferable to prepare an aluminum sulfate solution by digesting gypsite in a sulfuric acid and a sodium aluminate solution by digesting gypsite in a sodium hydroxide solution. In the preparation of the sodium aluminate solution, it is desirable to obtain the sodium aluminate solution having the Na/Al atomic ratio in the range of 1.15–1.25 by using an about 50% sodium hydroxide solution.

The first step of the present invention comprises reacting aluminum sulfate with sodium aluminate under constant conditions including the pH of 6.0–8.5 and the temperature of 50°–65° C. to thereby obtain the first aqueous slurry containing the amorphous alumina hydrate. The neutralizing reaction condition of this step can be achieved for instance by pouring simultaneously and at a constant flow rate the aluminum sulfate solution and the sodium aluminate solution heated to 50°–65° C. into deionized water heated to 50°–65° C. in a vessel. The reaction in the first step results in neutralization of the aluminum sulfate with sodium aluminate in an amount of ⅔–2.5/3 equivalent of aluminum sulfate used.

The second step of the present invention comprises completing the neutralizing reaction by adding the sodium aluminate solution to the above mentioned first aqueous slurry and obtaining the second aqueous slurry whose $Al_2O_3$ concentration is 7 wt. % or more. It is preferable that the neutralizing reaction in this step should also be carried out at a temperature of 50°–65° C., and in the addition of the sodium aluminate solution it is desirable that said solution should be added gradually in order to prevent the pH from rising rapidly. The amount of sodium aluminate used in the second step must be, in total including the amount of sodium aluminate used in the first step, the amount corresponding to 0.95–1.05 equivalent of the amount of sodium sulfate used in the first step. The reason is that in case this amount of sodium aluminate is less than 0.95 equivalent, it becomes difficult to wash and remove the sulfate anion, while in case the amount of sodium aluminate is over 1.05 equivalent, the stability of slurry is deteriorated exceedingly. In this connection, it is to be noted that in the case of using 0.95 equivalent of sodium aluminate, the final pH of the obtained second aqueous slurry at 60° C. is 9.2, while in the case of using 1.05 equivalent of sodium aluminate, said final pH is 10.2. However, when the pH of slurry is over 9.5, the stability of slurry deteriorates. In view of this, it is recommended to complete the second step within 30 minutes and transfer the resulting second aqueous slurry immediately to the third step.

The amorphous alumina hydrate-containing second aqueous slurry is subjected to filtration in the third step, and the obtained filter cake is conventionally washed first with an aqueous dilute ammonia solution and then with a dilute nitric acid solution. The washing with ammonia in this instance mainly aims at removal of the sulfate anion and sodium, while the washing with nitric acid mainly aims at removal of sodium. Generally, the former washing is effected by sprinkling the filter cake with about 1% ammonia solution and the latter is effected by repulping the filter cake in an about 1% nitric acid solution. Accordingly, the filter cake is filtrated again after the washing with nitric acid. The thus obtained filter cake is washed again with a dilute ammonia solution, but this washing with ammonia aims at further removing the sodium still remaining in the filter cake and regulating the pH of the cake to be in the range of 7.5–10.5.

In the fourth step of the present invention, the filter cake of the amorphous alumina hydrate, from which the impurities have been removed and whose pH has been regulated to be in the range of 7.5–10.5 in the preceding third step, is dehydrated by means of a filter press to such an extent that the $Al_2O_3$ concentration is in the range of about 28–35 wt. %, and thereafter is kneaded for 10 seconds or more by means of a self-cleaning type mixer.

The "self-cleaning type mixer" referred to herein implies a mixer which is capable of endowing the cake of the amorphous alumina hydrate with sufficient shearing effect, alternate compression and expansion effect. The mixer of this sort is characterized in that it is equipped with two parallel shafts of corotating agitators and the blades of one agitator assembly maintain close clearances with the second assembly as well as with the walls of the barrel. This provides a self-cleaning or self-wiping action for the agitator blades. For this purpose, there can be used the continuous mixers described in Brennan, Jr, U.S. Pat. Nos. 3,419,250 and 3,618,902, and in addition thereto there can be used the ZSK twin-screw machines (Werner & Pfleiderer Corp.) and the multipurpose mixer (Baker Perkins Inc.) outlined in Chemical Engineer's Handbook by Perry and Chilton, Fifth Edition, Section 19-21.

The pH condition in the fourth step is essential for contriving to grow the pseudoboehmite grains by kneading. Generally speaking, it is preferable that kneading is carried out in the vicinity of the isoelectric point of alumina, but it is possible to grow the pseudoboehmite grains provided that the pH is in the range of 7.5–10.5.

Referring to the temperature condition, furthermore, it can be said that the higher the temperature at the time of kneading is, the more the growing velocity of pseudoboehmite grains can be increased. According to the present invention, as the amorphous alumina hydrate is kneaded by using the self-cleaning type mixer, it is not only possible to contrive to grow the pseudoboehmite grains contained in said hydrate, but also possible to control the degree of growing grains, namely the pore characteristic of the final product, alumina carrier, by controlling the kneading time. It may generally be said that the increased kneading time increases the pore volume and average pore diameter, and somewhat reduces the specific surface area. And, the increased kneading time, furthermore, localizes the pore distribution in a narrow scope.

The dough taken out of the self-cleaning type mixer is extruded, in the fifth step of the present invention, by means of a conventional extruder, into extrudates having a desired size, thereafter dried and calcined in a known manner, whereby a final product, alumina carrier, can be obtained. The drying conditions employed in this instance generally comprise 350° C. and 1 hour and further 600° C. and 2 hours.

As explained above, the present invention can obtain the amorphous alumina hydrate, which is exceedingly superior in filterability, by means of the two-stage neutralizing method, whereby the impurities contained in this hydrate can be removed very easily by washing, and furthermore said hydrate can be economically dehydrated to a high level by using the filter press. In addition thereto, the present invention can readily prepare the alumina carrier having the pore characteristic satisfying the object of use, because the growth of pseudoboehmite grains can be attained by kneading the amorphous alumina hydrate dehydrated to a high level by means of the self-cleaning type mixer under the predetermined weak alkaline condition and further the degree of growth of said grains can be controlled by selecting the kneading condition.

Examples will be given hereinafter, but the present invention should not be limited thereto.

EXAMPLE 1

3575 g of an aluminum sulfate solution ($Al_2O_3$ concentration 8 wt. %) and 2644g of a sodium aluminate solution ($Al_2O_3$ concentration 27% and Na/Al atomic ratio 1.20) were simultaneously poured in 5546 ml of deionized water with stirring from each different pouring port and at a definite flow rate. The aluminum sulfate solution was completely poured in 60 minutes, and the sodium aluminate solution was completely poured in 80 minutes. During this reaction, the temperature was controlled so as to be held at 60° C.

The neutralizing reaction was carried out at the pH of 6.5-7.0 until the pouring of the aluminum sulfate was completed, thereafter the pH rose gradually, and an amorphous alumina hydrate slurry (pH 9.5 and $Al_2O_3$ concentration 8.5 wt. %) was obtained at the time when pouring of the sodium aluminate solution completed.

This slurry was supplied immediately to a vacuum filter for obtaining a filter cake, thereafter said cake was washed by sprinkling 10 l of a 0.1% aqueous ammonia thereon, and then this cake was repulped in 10 l of a 0.7% nitric acid solution.

Thereafter, the resulting slurry was treated again by the vacuum filter to obtain a filter cake, and this cake was washed by sprinkling 10 l of a 0.1% aqueous ammonia thereon. The $Al_2O_3$ content of the thus obtained cake was 21 wt. %, and its pH was 9.0. The contents of sulfate anion and sodium cation in this cake were 0.03% respectively based on $Al_2O_3$.

Next, the above mentioned cake was subjected to a filter press for dehydrating to obtain a dehydrated cake having $Al_2O_3$ content of 31 wt. %. This cake was provided to a self-cleaning type mixer and was kneaded under the conditions including jacket temperature of 100° C. and residence time of 35 seconds, to obtain a dough having $Al_2O_3$ content of 33 wt. %.

This dough was treated by an extruder to thereby obtain a 1.8 mm$\phi$ of extrudates. This extrudates were dried at 120° C. for 12 hours, thereafter was calcined at 350° C. for 1 hour and further at 600° C. for 2 hours, thereby obtaining Alumina Carrier (A).

COMPARATIVE EXAMPLE

A dehydrated cake obtained according to the same procedure as Example 1 was treated directly by the extruder without kneading to thereby obtain Alumina Carrier (X).

EXAMPLE 2

By repeating the exactly same procedure as Example 1 except that as the residence time in the mixer, 15 seconds and 210 seconds were employed, there were obtained Alumina Carriers (B) and (C).

The pore characteristics of the respective alumina carriers obtained by the above mentioned Examples 1-2 and Comparative Example are as shown in the following table.

| Sample | A | B | C | X |
|---|---|---|---|---|
| Specific surface area* ($m^2/g$) | 242 | 249 | 247 | 252 |
| Pore volume** (cc/g) | 0.701 | 0.540 | 0.812 | 0.227 |
| Average pore diameter** (Å) | 106 | 93 | 112 | 70 |

*BET method
**High Pressure Mercury Porosimeter

In addition, the pore distribution curve of alumina carriers A-C and X obtained by a mercury porosimeter under pressure is shown in the accompanying drawing.

What is claimed is:

1. A process of preparing an alumina catalyst carrier which comprises the steps of:
    (a) simultaneously pouring an aluminum sulfate solution and a sodium aluminate solution into deionized water in a vessel and therein reacting said aluminum sulfate with said sodium aluminate, under the conditions of a pH of 6.0-8.5 and a temperature of 50°-65° C., thereby to prepare a first aqueous slurry containing an amorphous alumina hydrate,
    (b) adding to said first aqueous slurry, an aqueous sodium aluminate solution in an amount sufficient to neutralize the first aqueous slurry, the sum of the amounts of sodium aluminate used in steps (a) and (b) corresponding to 0.95-1.05 equivalents of the amount of aluminum sulfate used in the step (a) thereby to prepare a second aqueous slurry having an $Al_2O_3$ concentration of 7 wt. % or more,
    (c) filtering off the amorphous alumina hydrate contained in said second aqueous slurry to obtain a filter cake thereof, and washing the resulting filter cake firstly with a dilute aqueous ammonia solution and then with a dilute nitric acid solution, and then washing the same again with a dilute aqueous ammonia solution so as to remove sulfate anion and sodium cation impurities and to regulate the pH of the filter cake to the range of 7.5-10.5,
    (d) then, without aging the filter cake, dehydrating the filter cake on a filter press and increasing its $Al_2O_3$ concentration to be in the range of 28-35 wt. %, and thereafter kneading the same, at a pH in the range of 7.5-10.5, in a self-cleaning type mixer for a residence time of 10 seconds or more to grow pseudoboehmite grains in a short time and thereby to obtain a dough containing those grains, and
    (e) extruding the dough obtained from the step (d) to form extrudates, and thereafter drying and calcining the resulting extrudates.

2. A process according to claim 1 wherein said aluminum sulfate solution is prepared by digesting gypsite in sulfuric acid and said sodium aluminate solution has an Na/Al atomic ratio of 1.15-1.25 and is prepared by digesting gypsite in a sodium hydroxide solution.

3. A process according to claim 1 wherein, in step (b), the addition of the sodium aluminate solution to the first aqueous slurry is carried out gradually for the purpose of preventing a rapid rise of pH.

4. A process according claim 1 wherein, in step (d), the kneading is effected by feeding the filter cake, at a pH in the range of 7.5 to 10.5, into a mixer having two parallel co-rotating bladed agitators diposed in a barrel with the blades of said agitators having close clearances with each other and with the wall of the barrel so that the filter cake is subjected to shearing and alternate compression and expansion effects and the blades are self-cleaning, whereby grains of pseudoboehmite are quickly grown.

5. A process for preparing an alumina catalyst carrier, which consists essentially of the steps of:
  (a) simultaneously pouring an aqueous aluminum sulfate solution and an aqueous sodium aluminate solution having a Na/Al atomic ratio in the range of 1.15 to 1.25 into a bath of deionized water contained in a vessel, and therein reacting said aluminum sulfate with said sodium aluminate, under the conditions of a pH of 6.0 to 8.5 and a temperature of 50° to 65° C., thereby to prepare a first aqueous slurry containing amorphous alumina hydrate, the amount of sodium aluminate added to the bath being in the range of from ⅔ to 2.5/3 equivalents of the amount of aluminum sulfate added to the bath;
  (b) gradually adding to said first slurry, over a period of up to 30 minutes, at a temperature of 50° to 65° C., an additional quantity of aqueous sodium aluminate solution to neutralize said first aqueous slurry, the sum of the amounts of sodium aluminate used in steps (a) and (b) corresponding to from 0.95 to 1.05 equivalents of the amount of aluminum sulfate added to the bath, and thereby obtaining a second aqueous slurry having an $Al_2O_3$ concentration of 7 wt. % or more;
  (c) immediately filtering said second aqueous slurry and obtaining a filter cake of amorphous alumina hydrate, then washing said filter cake first by spraying a dilute aqueous ammonia solution on said filter cake to remove sulfate anions and sodium cations therefrom, then repulping said filter cake in a dilute aqueous nitric acid solution, then filtering same to obtain a second filter cake of amorphous alumina hydrate and then spraying said second filter cake with a dilute aqueous ammonia solution to remove sodium cations and to regulate the pH of said second filter cake to be in the range of 7.5 to 10.5;
  (d) dehydrating said second filter cake on a filter press to increase the $Al_2O_3$ concentration of said second filter cake to be in the range of 28 to 35 wt. %, and then kneading said second filter cake, at a pH in the range of 7.5 to 10.5, for a period of 10 seconds or more, in a mixer having two parallel co-rotating bladed agitators disposed in a barrel with the blades of said agitators having close clearances with each other and with the wall of the barrel so that the second filter cake is subjected to shearing and alternate compression and expansion effects and the blades are self-cleaning, whereby grains of pseudoboehmite are quickly grown during said kneading step and said second filter cake is transformed to a dough; and
  (e) extruding said dough to form extrudates, and thereafter drying and calcining said extrudates.

* * * * *